US008136154B2

(12) United States Patent
Phoha et al.

(10) Patent No.: US 8,136,154 B2
(45) Date of Patent: Mar. 13, 2012

(54) HIDDEN MARKOV MODEL ("HMM")-BASED USER AUTHENTICATION USING KEYSTROKE DYNAMICS

(75) Inventors: Vir V. Phoha, Ruston, LA (US); Shashi Phoha, State College, PA (US); Asok Ray, State College, PA (US); Shrijit Sudhakar Joshi, Ruston, LA (US); Sampath Kumar Vuyyuru, Ruston, LA (US)

(73) Assignees: The Penn State Foundation, University Park, PA (US); Louisiana Tech Unversity Research Foundation, Ruston, LA (US)

( * ) Notice: Subject to any disclaimer, the term of this patent is extended or adjusted under 35 U.S.C. 154(b) by 981 days.

(21) Appl. No.: 12/116,142

(22) Filed: May 6, 2008

(65) Prior Publication Data
US 2009/0328200 A1 Dec. 31, 2009

Related U.S. Application Data

(60) Provisional application No. 60/938,001, filed on May 15, 2007.

(51) Int. Cl.
*G06F 7/04* (2006.01)
(52) U.S. Cl. .............. 726/19; 704/256; 704/240; 380/1; 382/115
(58) Field of Classification Search .................... 726/19; 704/256, 200; 706/52; 380/1
See application file for complete search history.

(56) References Cited

U.S. PATENT DOCUMENTS

| 4,805,222 | A * | 2/1989 | Young et al. | 382/115 |
| 6,466,908 | B1 * | 10/2002 | Baggenstoss | 704/256 |
| 2006/0294390 | A1 | 12/2006 | Navratil et al. | |
| 2007/0150747 | A1 | 6/2007 | Mani et al. | |

FOREIGN PATENT DOCUMENTS

WO WO-2007001390 1/2007

OTHER PUBLICATIONS

Araujo, L.C.F., Sucupira, L.H.R., Jr., Lizarraga, M.G., Ling, L.L., Yabu-Uti, J.B.T., "User authentication through typing biometrics features", Signal Processing, IEEE Transactions on, on pp. 851-855, vol. 53 Issue: 2, Feb. 2005.*
Chang, W.:Information Reuse and Integration, Conf, 2005. IRI-2005 IEEE International Conference on. Aug. 15-17, 2005.*
R. Joyce and G. Gupta, "Identity authentication based on keystroke latencies," Communications of the ACM, vol. 33, No. 2. pp. 168-176, Feb. 1990.*

(Continued)

*Primary Examiner* — Thanhnga B Truong
*Assistant Examiner* — Angela Holmes
(74) *Attorney, Agent, or Firm* — Blakely Sokoloff Taylor & Zafman LLP

(57) ABSTRACT

Hidden Markov Models ("HMMs") are used to analyze keystroke dynamics measurements collected as a user types a predetermined string on a keyboard. A user enrolls by typing the predetermined string several times; the enrollment samples are used to train a HMM to identify the user. A candidate who claims to be the user provides a typing sample, and the HMM produces a probability to estimate the likelihood that the candidate is the user he claims to be. A computationally-efficient method for preparing HMMs to analyze certain types of processes is also described.

17 Claims, 6 Drawing Sheets

OTHER PUBLICATIONS

Louisiana Tech University, et al., International Preliminary Report on Patentability dated Nov. 26, 2009 for PCT/US2008/005888.

Louisiana Tech University, et al., Partial International Search dated Mar. 2, 2009 for PCT/US2008/005888.

Rodrigues, et al., "Biometric access control through numerical keyboards based on keystroke dynamics", Advanced in Biometrics Lecture Notes in Computer Science, vol. 3832, (Jan. 1, 2005), 640-646.

Rabiner, LR, "A tutorial on hidden markov models and selected applications in speech recognition," Proceedings of the IEEE, vol. 77, No. 2, Feb. 1989, pp. 257-286.

Rabiner, LR, et al., "An introduction to hiddgen markov models," IEEE ASSP Magazine, Jan. 1986.

Song, DX, et al., "Timing Analysis of keystrokes and timing attacks on SSH," Proceedings of the 10th USENIX Security Symposium, Aug. 2001, Washington, D.C.

Louisiana Tech University, International Search Report and Written Opinion dated May 15, 2009 for PCT/US2008/005888.

* cited by examiner

HIDDEN MARKOV MODEL ("HMM")-BASED USER AUTHENTICATION USING KEYSTROKE DYNAMICS

CROSS-REFERENCE TO RELATED APPLICATION

This application claims the benefit of the earlier filing date of U.S. Provisional Patent Application No. 60/938,001, filed May 15, 2007, and incorporated herein by reference.

STATEMENT REGARDING FEDERALLY SPONSORED RESEARCH

This technology was developed in part with support from an Army grant under contract DAAD 19-01-1-0646 awarded by the United States Army Research Office. The Government has certain rights in the technology.

FIELD

The invention relates to computer security. More specifically, the invention relates to methods for identifying and/or authenticating computer users.

BACKGROUND

Computers often contain, or control access to, valuable assets. Therefore, user authentication (confirming that a user is who he says he is) is an important component in computer system operations. User authentication methods have traditionally been based on passwords; the security of such systems depends mainly on the secrecy of the passwords. Passwords are the most familiar example of a "know something" security method: access rights are granted to anyone who knows the password. Drawbacks of "know something" systems are well-understood: an attacker can subvert the system by guessing the password, or by forcing, tricking or colluding with a legitimate user to reveal the secret.

Another common type of security system is based on legitimate users having a physical token such as a key or identification badge (a "have something" system). These systems are also well-understood, and can be subverted by an attacker who steals or copies a physical token. (Tokens are often made difficult to copy to improve the security of such systems.)

Combination systems ("have something, know something") require a prospective user to present a physical token and to prove knowledge of a secret such as a Personal Identification Number ("PIN") or password. Such systems may be somewhat more secure, but are still vulnerable to the same sorts of attacks, because physical tokens and secrets can both be separated from their rightful owners and used by an impostor.

A number of biometric security systems have been developed to tie access rights more closely to an authorized person, rather than anyone who simply possesses the authorized person's objects or secrets. For example, fingerprints, iris and retina images, voice recognition and hand geometry have all been used to identify individuals in connection with a security system. These approaches can provide varying levels of confidence that a person is who he claims to be. Unfortunately, many of these systems depend on uncommon and/or expensive hardware to perform the measurements, so they may not be suitable for use in large-scale, heterogeneous environments.

One biometric authentication method that has attracted some attention for its flexibility, discriminative power and lack of reliance on specialized hardware is based on keystroke timing measurements. It has been observed that individuals type differently from one another, and that typing style (speed, pressure, rhythm, intercharacter delays, and so on; together, "keystroke dynamics") carries information that can be used to identify the typist. (Note that this information is present regardless of the text being typed—there is no requirement that a secret password be used.)

Keystroke dynamics systems based on statistical and neural-network models have been proposed (e.g., Young, Cho), but implementations suffer from computational complexity and operational drawbacks that limit their acceptance. For example, a statistical or neural authentication system may take an unacceptably long time to identify a user, require excessive reconfiguration to add or remove a user to a database of authorized users, or demand unrealistically consistent typing skills to distinguish between users. A keystroke-dynamics-based authentication system that improves these areas may be of interest.

SUMMARY

A keystroke dynamics-based identification and authentication system using a modified Hidden Markov Model ("HMM") to analyze keystroke data is proposed. Techniques for reducing computational complexity and improving identification accuracy and authentication accuracy are described.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention collect a plurality of keystroke dynamics measurements of a user and build a model that can be used later to estimate a probability that a sample string was typed by the same user. This can form the basis of a computer authentication system, as follows: models are built for plurality of legitimate users (e.g., "Alice," "Bob" and "Charles."). Subsequently, a user X (who may claim to be one of the legitimate users) provides a typing sample. The system can determine which of Alice, Bob or Charles is most likely to have produced the sample, and also the probability that X is who he or she claims to be, given the typing sample he or she produced. Based on these two probabilities, the system can provide a confidence measure that X really is Alice, Bob or Charles. Access decisions (or further security measures) can be implemented according to the confidence measure. The models prepared by an embodiment have some of the properties of traditional Hidden Markov Models ("HMMs"), but are constructed using specialized techniques that produce the models with significantly reduced computational effort. These techniques can also be applied to other datasets, thereby permitting HMMs to be used for data analysis in other fields.

Figure 1A:
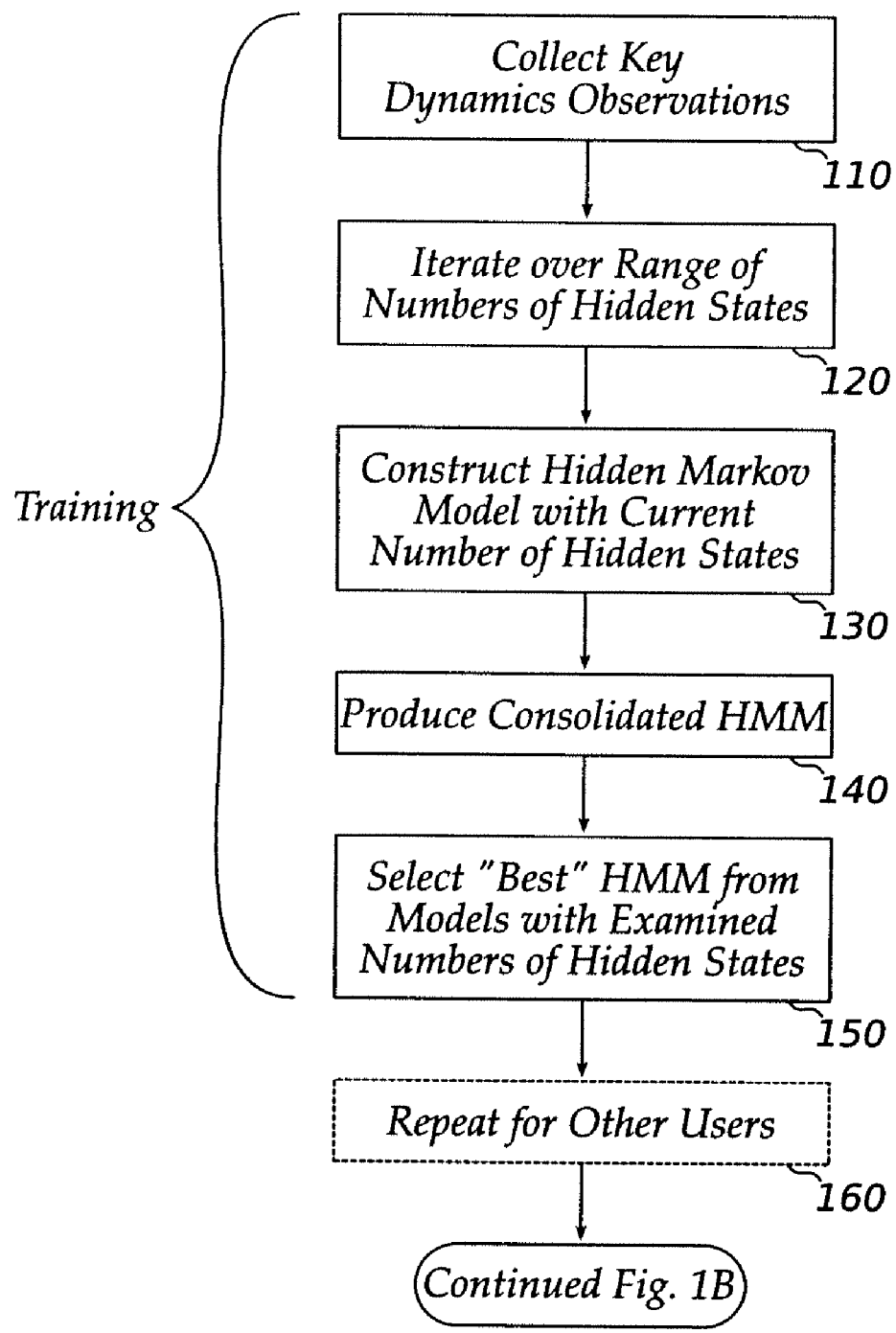
FIGS. 1A and 1B show a flow chart outlining operations according to an embodiment of the invention.
Figure 1B:
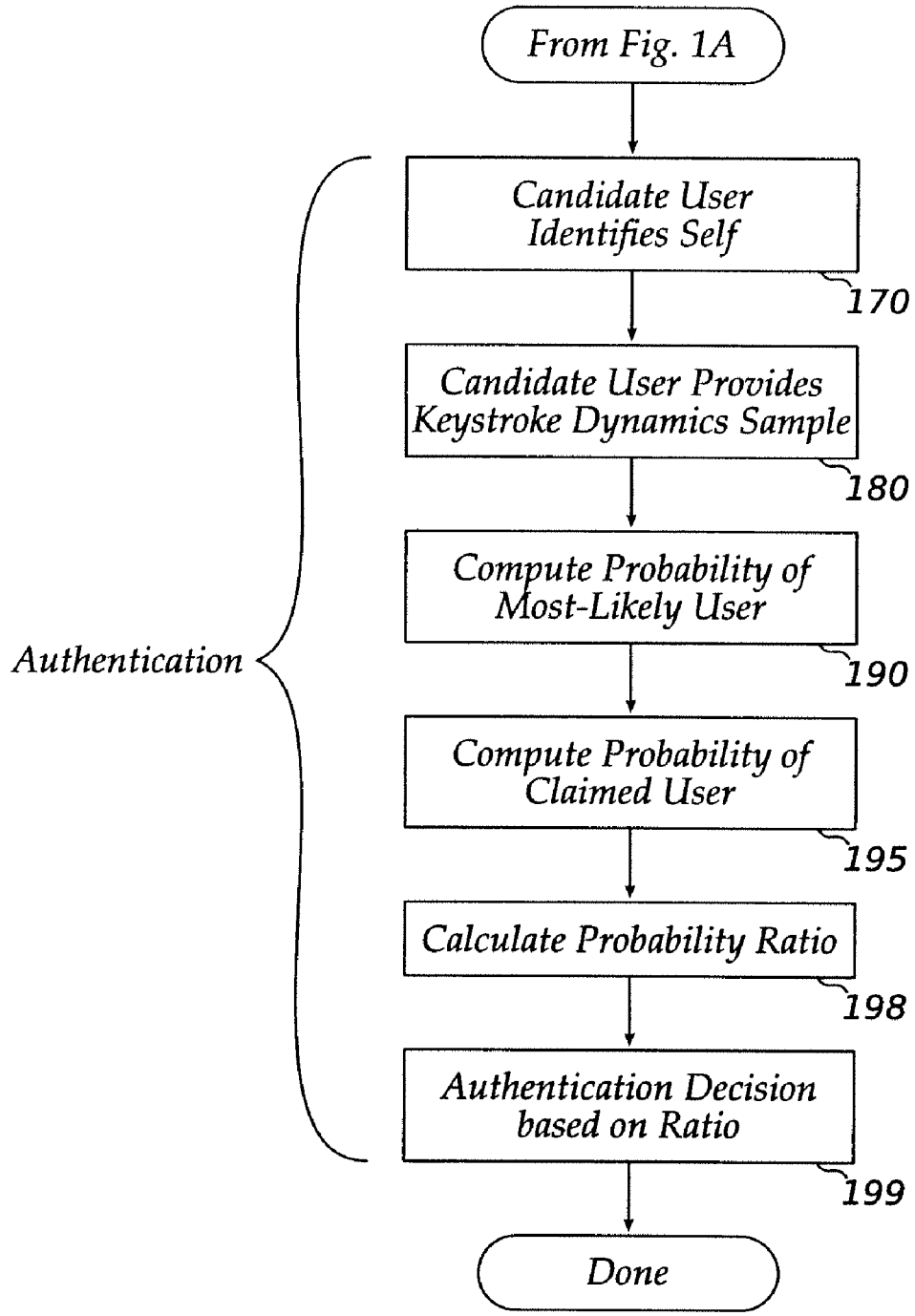

FIGS. 1A and 1B contain a flow chart outlining operations according to an embodiment of the invention. A plurality of keystroke dynamics observations are collected (110). A number of different measurements of keyboard activity can be used (e.g., key press duration, key release-to-subsequent-key press delay, key overlap, key pressure), but in the present disclosure, only key press duration will be considered. Each observation consists of key press durations for a sequence of keys; there are as many key press duration elements, as there are characters in the typed string. As a concrete example, the plurality of keystroke dynamics observations may be key press durations for a user performing six trials typing the 32-character string "master of science in computer science." (Spaces are ignored in this example.) This would produce six, 32-element vectors containing key press durations (measured, for example, in milliseconds).

Next, for each of a range of numbers of hidden states (120), each of the vectors is used to produce a Hidden Markov Model ("HMM") having the corresponding number of hidden states per observation vector element (130). Each HMM is defined by a number of parameters, discussed below, which are referred to collectively as "$\lambda$". Subscripts on $\lambda$ refer to the observation vector and the number of hidden states per observation element in the model. For example, $\lambda_{12}$ is the HMM produced from the first observation vector, assuming two hidden states per observation element.

The HMMs for the observation vectors and a particular number of hidden states (i.e., $\lambda_{mn}$ for all values of m and one value of n) are consolidated into a single HMM using a variant of the Baum-Welch expectation maximization ("EM") algorithm (140). This produces the best HMM to model the observations using that number of hidden states. The best HMMs for each of a number of hidden states are compared, and the one that best fits the observation vectors is selected (150). This process is referred to generally as "training." (EM is an iterative process, and "best" means "the best model identified during the iterations performed," not "the best model that could possibly be constructed to describe the observations.")

Operations 110-150 may be repeated for observation vectors of other users, resulting in a "best" HMM to fit each user's typing (160). This portion of the process is called the enrollment phase. Note that the HMM corresponding to each user is independent of the other users' HMMs. Each HMM depends only on the observation vectors collected while the user repeatedly types a single, well-known string, and the subsequent training process. Therefore, new users can be added to the system at any time (there is no need to re-visit already-enrolled users and re-train their HMMs). Also, users can be removed from the system at any time, simply by deleting the corresponding HMMs.

Later, an authentication phase occurs: a candidate user identifies himself or herself (170) and provides a sample authentication vector by typing the well-known string (180). Two probabilities are computed based on the HMMs produced by the enrollment phase. First, the HMM that gives the highest probability of modeling the system that produced the authentication vector is identified, and the corresponding probability is noted (190). Second, the HMM corresponding to the user the candidate claims to be is used to compute the probability that that user produced the authentication vector (195). Finally, a ratio between these two probabilities is computed (198) and used to direct subsequent authentication procedures (199). For example, ratios exceeding a first threshold may provide a high degree of confidence that the candidate user is who he claims to be. In that case, the user may be granted corresponding access privileges. Ratios falling within a second range may provide less confidence, so reduced privileges may be granted, a supplemental authentication process may be triggered, or extra monitoring of the user's session may be performed. An example of a supplemental authentication process is a query for additional information that the claimed user should know. The system could request the claimed user's (spouse's) maiden name or a child's date of birth. Only if the candidate user's typing of the authentication vector is suspect would he be subjected to this additional scrutiny.

Hidden Markov Models are often used to infer conditions in systems where a stochastic process with the Markov property is known (or believed) to exist, but the details of the process are not subject to observation. Instead, only external features of the system (or elements that may be somehow related to the system) can be observed. Generally speaking, a HMM answers the question, "what is the probability that the system modeled by this HMM would operate so as to produce the observed sequence?" HMMs find application in, for example, speech recognition, optical character recognition, natural language processing and bioinformatics.

Figure 2:
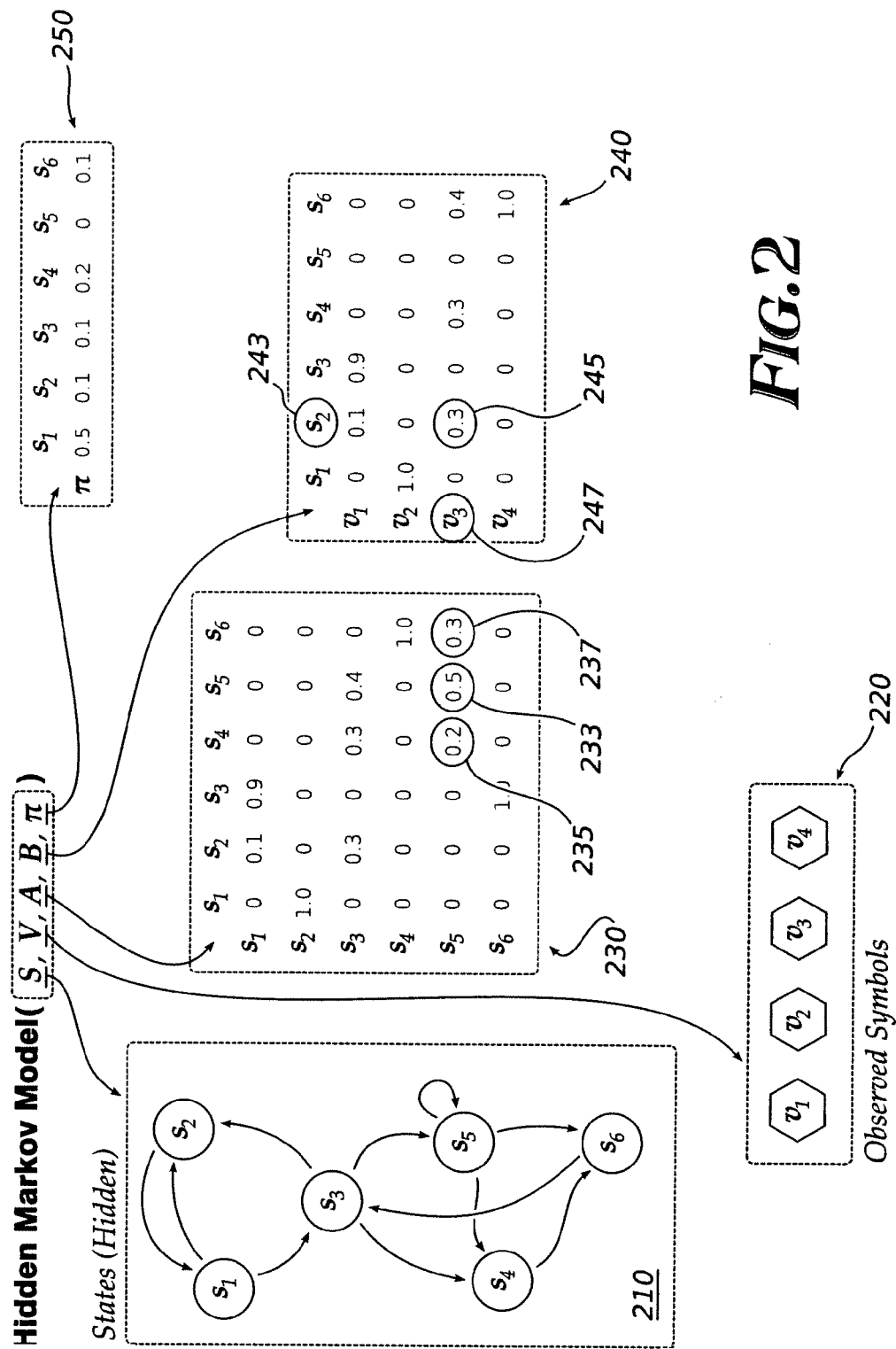
FIG. 2 shows several parameters of a Hidden Markov Model ("HMM").

A Hidden Markov Model is defined by a set of five parameters: S, V, A, B and $\pi$, which are described with reference to FIG. 2. (A complete set of parameters is denoted by the shorthand $\lambda$, as mentioned above.) S is the set of states (210). The modeled system is assumed to be in exactly one of the states at any time, and to progress from state to state as time goes on. The system's progress through the state space cannot be directly observed, but the set of observation symbols V (220) provide clues or indications regarding the system's progression.

The system's state is presumed to have the Markov property: a transition from state $s_m$ to $s_n$ happens with a probability that is independent of the states that occurred before $s_m$. State transition probability matrix A (230) encodes the probability of the system moving from state $s_m$ to $s_n$. For example, in state $s_5$, the system has a 50% probability of remaining in the state (233), a 20% probability of changing to state $s_4$ (235), and a 30% probability of changing to state $s_6$ (237).

Matrix B (240) connects the internal states $s_i$ with the external observations $v_j$, providing a probability that an external observation will occur when the system is in each state $s_i$. For example, in state $s_2$ (243), there is a 30% probability (245) that observation $v_3$ (247) will be made.

$\pi$ (250) is a matrix that provides probabilities for the system's initial state: $\pi_i$ indicates the probability that the system starts in state $s_i$.

The well-known Baum-Welch algorithm provides a powerful, but computationally expensive, method for adjusting the parameters A, B and $\pi$ to maximize the probability that an HMM with a given number of states S assigns to a set of training observations. A, B and $\pi$ can be initialized to random values (or to values estimated based on an understanding of the modeled system and the significance of various states), and iteratively refined through the Baum-Welch algorithm to produce a tuned or "trained" HMM. However, the keystroke dynamics example described in relation to FIG. 1, and other applications described below, have a property that permits the creation of a Hidden Markov Model with much less effort. In fact, the computational complexity of the Baum-Welch algorithm is on the order of $N^2T^3$ ("$O(N^2T^3)$"), N is a number of states in S and T is a number of observations), whereas the optimized algorithm presented below is only $O(N^2T)$, an improvement of $T^2$.

Figure 3:
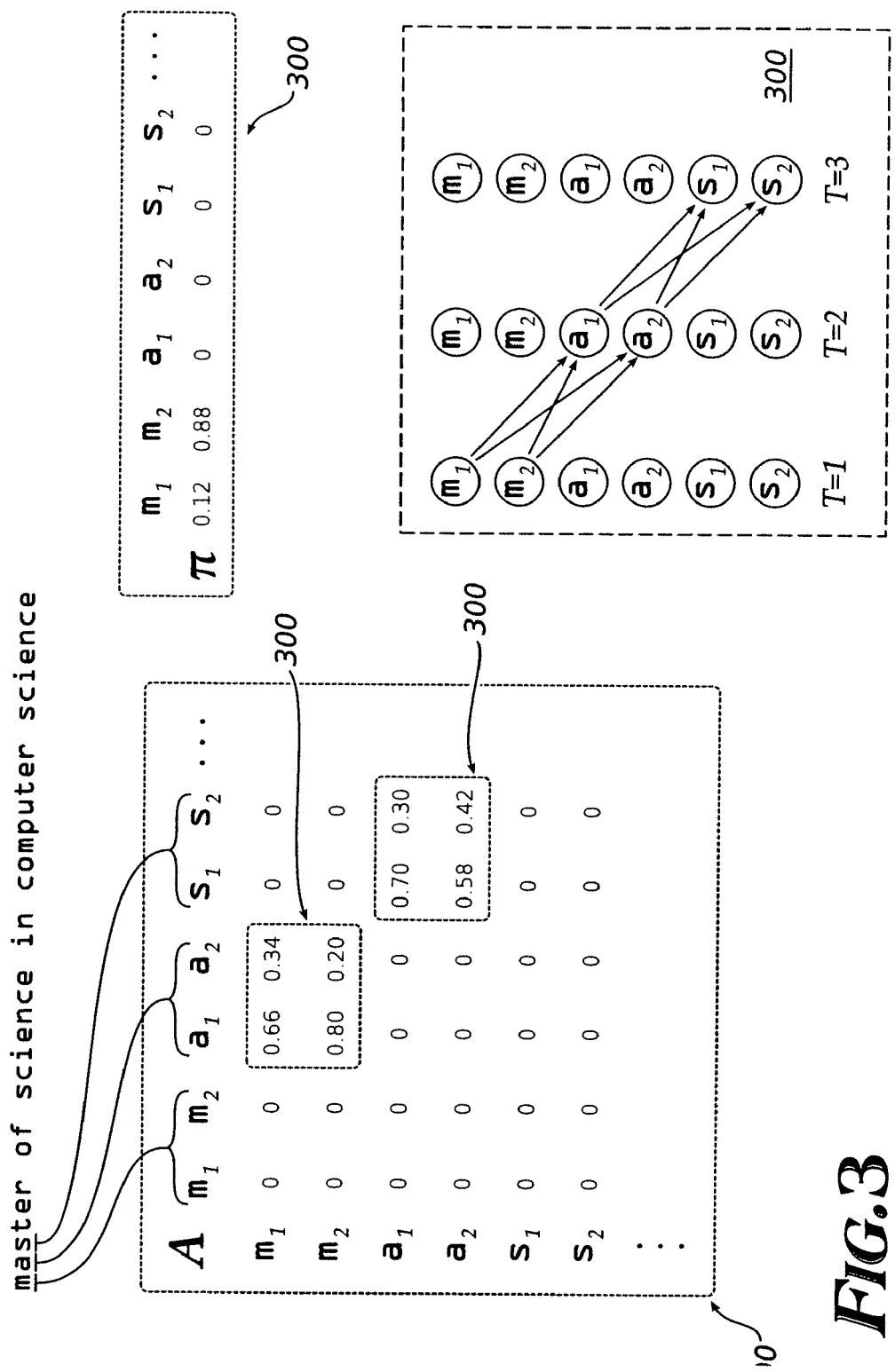
FIG. 3 shows a partial HMM for analyzing keystroke dynamics observations.

Returning to the keystroke-dynamics authentication example discussed earlier, FIG. 3 shows a portion of the A matrix 300 of a HMM with two states per character in the fixed string, "master of science in computer science". Repeated characters in the string do not share the same states. For example, states 310 and 320, corresponding to the 'm' in "master," are different from the two states corresponding to the 'm' in "computer." (The portion of the A matrix 300 shown here does not extend far enough to show the states corresponding to the second 'm.') Note that the states do not have any physical significance, and it is not known whether an HMM with one state per character, two states per character, or more states per character, will produce a better HMM. In fact, embodiments examine HMMs with varying numbers of states per character to find the HMM with the best performance on the training vectors.

Here, states 310 and 320 are states the system might be in after the first 'm' is typed. If the system is in state 310, then there is a 66% chance that it will advance to state 330 after 'a' is typed, and a 34% chance that it will advance to state 340. If the system is in state 320, there is an 80% chance that it will advance to state 330 after 'a' is typed, and a 20% chance that it will advance to state 340. Other probabilities in this portion of the A matrix (350, 360) are uniformly zero, because the system will never stay in 310 or 320 after 'a' is typed, nor will it advance to one of the states in 360, associated with the 's' that will be typed after 'm' and 'a.' The π matrix 370 is similarly sparse: the system will always start in either state 310 or 320, and not in any other state. Inset 380 shows another view of possible state transitions at times t=1, t=2 and t=3.

Figure 4:
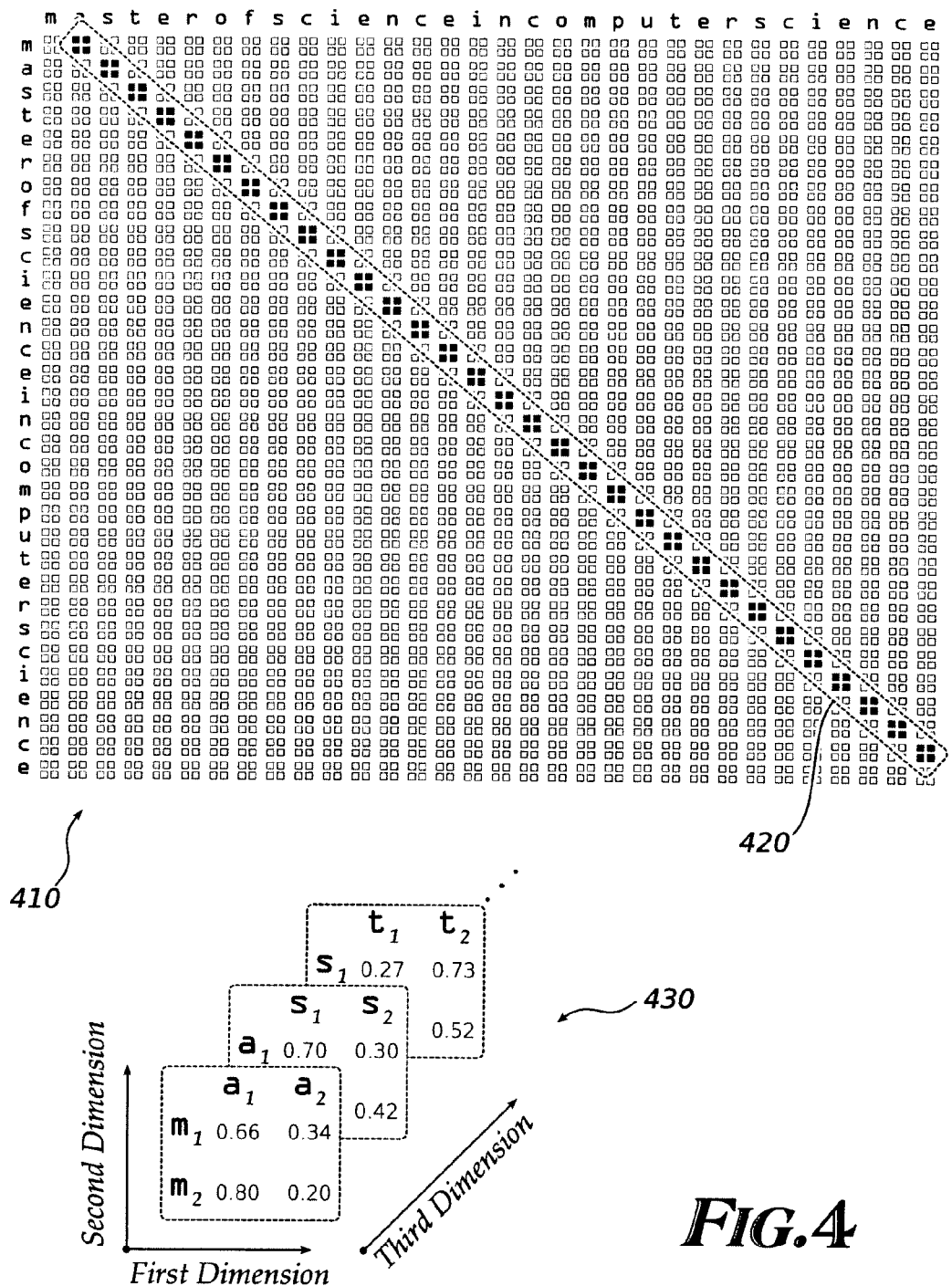
FIG. 4 shows a full HMM state transition matrix and an optimized, modified state transition matrix according to an embodiment of the invention.

The complete A matrix associated with the HMM having two sub-states per character and 32 characters in the fixed string is a 64×64 matrix, but all the entries except those in 2×2 sub-matrices just off the diagonal are zero. FIG. 4 represents this matrix at 410; non-zero elements are shown as black squares 420. According to an embodiment of the invention, this large, two-dimensional matrix is restructured as a smaller, three-dimensional matrix 430, where two dimensions correspond to the two sub-states per character, and the third dimension corresponds to the series of characters. Matrix 430 has only 2×2×32=128 entries (most or all of which are non-zero), while matrix 410 has 64×64=4096 entries, most of which are zero. Operations involving matrix 430 can be performed much more quickly than operations involving matrix 410. HMMs with larger numbers of sub-states per character will benefit even more.

The observed symbols in the keystroke dynamics example are continuous values: the length of time each key is depressed as the user types the fixed string. Therefore, a natural representation for the output symbol probability matrix B is a set of probability distributions initialized from the mean and standard deviation of the key press durations in the training samples. Experiments have shown that these times are normally distributed, so the elements of B can be the μ and σ parameters of a Gaussian probability distribution function. Given these values for a particular character in the observation sequence, it is trivial to compute the probability that a particular key press duration would occur in a test observation set.

The foregoing informal description of the Hidden Markov Model parameter matrices is intended to convey the general idea underlying an embodiment of the invention. Following are precise mathematical statements of how an embodiment constructs a HMM. These procedures are applicable when the state transition matrix, output symbol matrix and initial-state matrices satisfy the following properties:

1. States producing an observation symbol at time t do not produce observation symbols at any other time during an observation sequence;
2. Only the states producing the first observation symbol in an observation sequence can have non-zero initial state probability values; and
3. The probabilities in the state transition matrix for states producing an observation symbol at time t are non-zero for transitions to states that produce observation symbols at time t+1, and zero for other states.

Such matrices are found when the system has a well-defined directional progression, although the precise sequence of sub-states is not predetermined. For example, in the keystroke dynamics case, each observation element advances the system's state from one of n sub-states corresponding to the last-typed character, to one of n sub-states corresponding to the currently-typed character. The system's state will never go back, and will never skip ahead to some later state. The phrase "unidirectional stochastic process" will be used to denote a system that operates this way. Other systems with similar properties will be discussed below.

Figure 5:
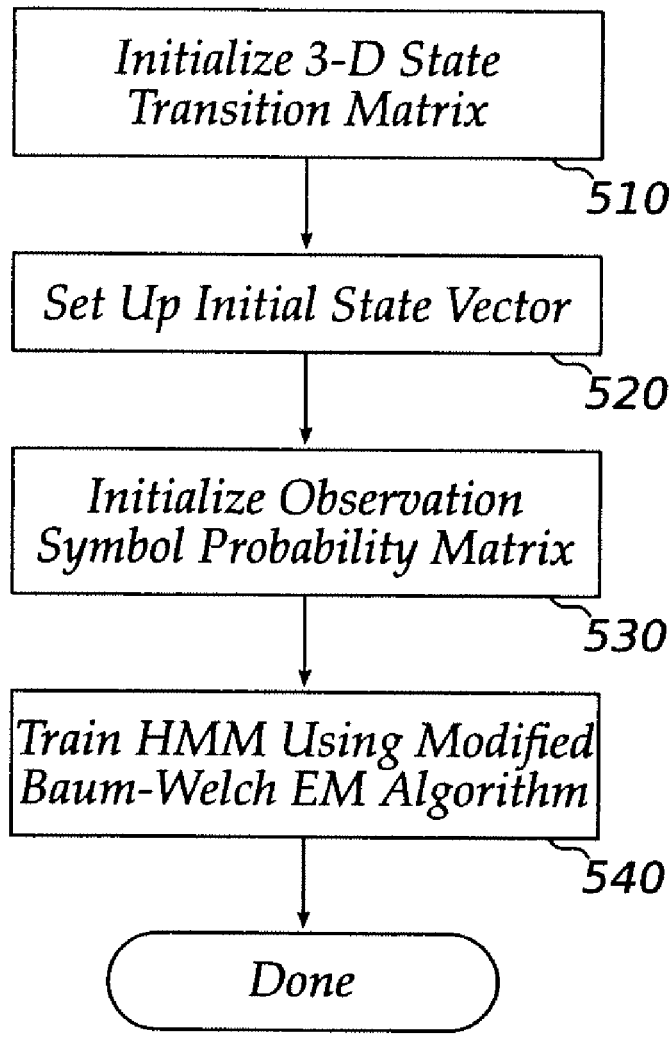
FIG. 5 outlines the creation of an HMM using an optimized state transition matrix.

Turning to FIG. 5, a formal mathematical analysis of operations of an embodiment of the invention is presented. First, the three-dimensional state transition matrix $\overline{A}$ is initialized (510). As explained above, this matrix contains a selected subset of the full A matrix. The values of the matrix are set randomly, with the caveat that the aggregate probability of advancing from any sub-state to one of the succeeding sub-states should be 1. The correspondence between values $\overline{a}_{trs}$ of $\overline{A}$ and values a[m][n] of A is given by Equation 1:

$$\overline{a}_{trs} = a[r + (t-1)N][s + tN], \quad \begin{array}{c} 1 \leq r, s \leq N \\ 1 \leq t \leq T \end{array} \quad \text{(Eq. 1)}$$

N is the number of states per observation element, and T is the number of observation elements in the observation sequence, r represents a state corresponding to the $t^{th}$ observation element and s represents a state corresponding to the $(t+1)^{th}$ observation element of the observation sequence.

Since the system must start in one of the N states of the first observation element, only the first N elements of the initial state probability vector π are non-zero; this vector is initialized accordingly (520) (the values $\pi_1 \ldots \pi_n$ may be set randomly, with a sum of 1).

The observation symbol probability matrix B is initialized (530) with the mean μ and standard deviation σ of elements of the training observation vectors.

The initialized HMM is trained on the reference keystroke patterns (540) using the Baum-Welch form of the EM algorithm, modified to accommodate the three-dimensional state-transition matrix $\overline{A}$ as follows:

Modified Forward Procedure $$\text{Initialization: } \overline{\alpha}_1(r) = \overline{\pi}_r \overline{b}_r(1, o_1) \quad 1 \leq r \leq N \quad \text{(Eq. 2)}$$

where r represents a state corresponding to the first observation element of an observation sequence.

$$\text{Induction: } \alpha_{t+1}(s) = \left[ \sum_{r=1}^{N} \alpha_t(r) a_{trs} \right] b_s(t+1, o_{t+1}) \quad \text{(Eq. 3)}$$

$$1 \leq t \leq T - 1$$

where r represents a state corresponding to the $t^{th}$ observation element and s represents a state corresponding to the $(t+1)^{th}$ observation element of an observation sequence.

Termination $P(O \mid \lambda) = \sum_{r=1}^{N} \overline{\alpha}_T(r)$  $1 \leq t \leq T-1$  (Eq. 4)

Modified Backward Procedure

Initialization: $\overline{\beta}_T(s)=1$  (Eq. 5)

where s represents a state corresponding to the $T^{th}$ observation element of an observation sequence.

Induction: $\overline{\beta}_t(r) = \sum_{s=1}^{N} \overline{a}_{trs} \overline{b}_s(t+1, o_{t+1}) \overline{\beta}_{t+1}(s)$  (Eq. 6)

$t = T-1, T-2, \ldots, 1$

In the expectation step, the γ variable is estimated using the modified forward and backward procedures ($\gamma_t(j)$ represents the probability that the HMM was in state j at time t). In the maximization step, the model parameters are re-estimated using modified versions of Rabiner's formulae:

Modified Rabiner's Re-Estimation Formulae $$\overline{\pi}_r = \frac{\sum_{k=1}^{K} \frac{1}{P(O^k \mid \lambda_{kN})} \gamma_1^k(r)}{\sum_{k=1}^{K} \frac{1}{P(O^k \mid \lambda_{kN})}}$$  (Eq. 7, 8)

$$\overline{a}_{trs} = \frac{\sum_{k=1}^{K} \frac{1}{P(O^k \mid \lambda_{kN})} \left(\overline{\alpha}_t^k(r) \overline{a}_{trs} \overline{b}_s(t+1, o_{t+1}^k) \overline{\beta}_{t+1}^k(s)\right)}{\sum_{k=1}^{K} \frac{1}{P(O^k \mid \lambda_{kN})} \left(\overline{\alpha}_t^k(r) \overline{\beta}_t^k(r)\right)}$$

$$\overline{\mu}_{ts} = \frac{\sum_{k=1}^{K} \gamma_t^k(s) o_t^k}{\sum_{k=1}^{K} \gamma_t^k(s)}$$  (Eq. 9, 10)

$$\overline{\sigma}_{ts} = \frac{\sum_{k=1}^{K} \gamma_t^k(s)(o_t^k - \overline{\mu}_{ts})^2}{\sum_{k=1}^{K} \gamma_t^k(s)}$$

where:
(i) $O^k$ is the $k^{th}$ observation vector of a user,
(ii) K observation vectors are provided by a user in the enrollment phase,
(iii) subscripts on λ refer to the observation vector (k) and the number of hidden states per observation element (N) in the model, and
(iv) HMM parameters (A, B, ∂), forward variable $\overline{\alpha}$, backward variable $\overline{\beta}$ and variable γ belonging to the model of the $k^{th}$ observation are super-scripted with k.

As discussed with reference to FIG. 1, these operations are repeated for several values of N (the number of states per observation element) and the best HMM examined is selected as the HMM to identify the user who provided the training samples. Once such a model is created, it can be used to authenticate a candidate user who claims to be the corresponding user.

Other processes similar to keystroke dynamics include speaker verification and speaker identification. In speaker verification, if a speaker recites a fixed phrase, then the optimized HMM discussed above may be used with digitized audio samples of the speaker's voice. For speaker identification, if the speaker recites a fixed phrase, then the optimized HMM preparation algorithm can be used to prepare HMMs that can identify the speaker from among a group of enrolled speakers. Signature verification based on pen location and pressure features also has appropriate characteristics to permit optimized HMM preparation according to an embodiment of the invention.

On the Complexity of the Modified Hidden Markov Model Construction

Classifying algorithms on the basis of their complexity permits significant advances to be distinguished from approaches that appear different but in fact are merely alternate implementations of the same algorithm. Here, the asserted complexity of the modified HMM construction ($O(N^2T)$) will be proven.

In the modified forward procedure, the initialization step is $\overline{\alpha}_1(r) = \overline{\pi}_r \overline{b}_r(1, o_1)$  $1 \leq r \leq N$  Eq. 11 and the induction step is $$\overline{\alpha}_{t+1}(s) = \left[\sum_{r=1}^{N} \overline{\alpha}_t(r) \overline{a}_{trs}\right] \overline{b}_s(t+1, o_{t+1})  \begin{array}{l} 1 \leq s \leq N \\ 1 \leq t \leq T-1 \end{array}$$  Eq. 12

In the initialization step of the modified forward procedure, for each changed value of r (i.e., from 1 to N), there is a multiplication. Therefore, there are N multiplications in this step. In the induction step, for each changed value of s (i.e., from 1 to N), there are (N+1)(T−1) multiplications. Therefore, there are N(N+1)(T−1) multiplications in this step. Similarly, in this step, for each changed value of s, there are (N−1)(T−1) additions. Therefore, there are N(N−1)(T−1). Hence, the total number of multiplications and additions in the modified forward procedure is N+N(N+1)(T−1) and N(N−1)(T−1), respectively. Therefore, the computational complexity in the modified forward procedure is $O(N^2T)$, as stated earlier. Analyses of the computational complexity of the forward procedure using unmodified HMM parameters may be found in the literature; the complexity is $O(N^2T^3)$. Consequently, embodiments of the invention reduce the computational complexity of the forward procedure by $T^2$.

An embodiment of the invention may be a machine-readable medium having stored thereon data and instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

As is clear from the above discussion, a method or a machine readable medium embodying a method may be performed or embodied in any number of devices, including a desktop computer, a portable computer, a personal digital assistant, console device or other handheld processing device (e.g., a mobile phone) and a keypad access device (e.g., entry access device). In embodiments describing implementation with a keypad, a suitable keypad may include, but is not limited to, a QWERTY keypad, a numerical keypad, a letter keypad, an alphanumeric keypad, a symbolic keypad, or an alphanumeric-symbolic keypad having physically depressible keys or touch-screen response.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "collecting," "constructing," "updating," "modifying," "assigning," "requesting," "computing," "performing," "granting," "using," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The applications of the present invention have been described largely by reference to specific examples and in terms of particular allocations of functionality to certain hardware and/or software components. However, those of skill in the art will recognize that user authentication via Hidden Markov Model analysis of keystroke dynamics samples can also be performed by software and hardware that distribute the functions of embodiments of this invention differently than herein described. Such variations and implementations are understood to be captured according to the following claims.

We claim:

1. A method comprising:
    collecting at a computer keypad, a plurality of first enrollment keystroke vectors from a first enrolling user;
    constructing a first Hidden Markov Model ("HMM") based on the plurality of first enrollment keystroke vectors;
    collecting a second plurality of enrollment keystroke vectors from a second enrolling user;
    constructing a second HMM based on the second plurality of enrollment keystroke vectors;
    collecting a claimed identity from an authenticating user;
    collecting a test keystroke vector from the authenticating user;
    computing a first probability that the authenticating user is identical to the enrolling user based on the test keystroke vector and the HMM;
    computing a second probability that the authenticating user is identical to the second enrolling user based on the test keystroke vector and the second HMM; and
    computing a third probability that the test keystroke vector was produced by the claimed identity using an HMM associated with the claimed identity; and performing a user authentication based on a ratio between the third probability and a maximum probability of the first and second probabilities.

2. The method of claim 1 wherein each of the keystroke vectors comprises a plurality of keystroke event timing elements.

3. The method of claim 1, further comprising: collecting an answer to a supplemental authentication question if the probability is below a predetermined threshold.

4. The method of claim 1, further comprising: granting restricted access rights if the probability is below a predetermined threshold.

5. The method of claim 1 wherein the plurality of enrollment keystroke vectors and the test keystroke vector are keystroke key press duration vectors, and wherein the keypad is one of a keyboard and a touch-screen.

6. A method comprising:
    collecting at a computer keypad, a sequence of observations of a unidirectional stochastic process;
    computing parameters of a first Hidden Markov Model ("HMM") based on the sequence of observations through an algorithm with complexity $O(N^2T)$, where N is a number of sub-states per physical state, and T is a number of physical states;
    computing parameters of a second HMM based on the sequence of observations through the algorithm with complexity $O(M^2T)$, where M is a number of sub-states per physical state, T is a number of physical states, and M is not equal to N; and
    using the first HMM to compute a probability that a test observation sequence would be produced by a system described by the first HMM, wherein the sequence of observations of the unidirectional scholastic process are a plurality of keystroke dynamics key press duration measurements; and
    preparing a consolidated HMM based on the parameters of the first HMM and the parameters of the second HMM.

7. The method of claim 6 wherein the HMM is a first HMM, the method further comprising:
    computing parameters of a second HMM based on a second sequence of observations; and selecting one of the first HMM or the second HMM as more likely to represent a system that produced the test observation sequence.

8. The method of claim 6 wherein the sequence of observations comprises a plurality of keystroke dynamics measurements.

9. The method of claim 6 wherein the sequence of observations comprises digitized audio samples of a speaker reciting a predetermined phrase.

10. The method of claim 6 wherein the sequence of observations comprises features extracted from a signature.

11. The method of claim 6 wherein the keypad is one of a keyboard and a touch-screen.

12. The method of claim 7 wherein the first HMM represents a first person, the second HMM represents a second person, and selecting one of the first HMM or the second HMM is identifying a user who produced the test observation sequence.

13. A machine-readable non-transitory medium containing data and instructions to cause a programmable processor to perform operations comprising:
 collecting enrollment keystroke dynamics timing measurements as a user types a predetermined string;
 preparing a Hidden Markov Model ("HMM") based on the enrollment keystroke dynamics timing measurements, wherein preparing the HMM comprises constructing a three-dimensional state transition matrix, where a first dimension of the matrix corresponds to a plurality of sub-states of a first character of the predetermined string, a second dimension of the matrix corresponds to a second character of the predetermined string, and a third dimension of the matrix corresponds to a plurality of characters of the predetermined string;
 collecting authentication keystroke dynamics timing measurements as a candidate types a predetermined string; and using the HMM to estimate a probability that the candidate is identical to the user, wherein the enrollment keystroke dynamics timing measurements and the authentication keystroke dynamics timing measurements comprise key press duration for each character of the predetermined string.

14. The machine-readable non-transitory medium of claim 13 wherein the HMM has a plurality of sub-states corresponding to each character of the predetermined string.

15. The machine-readable non-transitory medium of claim 13, containing additional data and instructions to cause the programmable processor to perform operations comprising: granting access to the candidate if the probability exceeds a predetermined threshold.

16. The machine-readable non-transitory medium of claim 13, containing additional data and instructions to cause the programmable processor to perform operations comprising: performing a supplemental authentication process if the probability is below a predetermined threshold.

17. The machine-readable non-transitory medium of claim 13, wherein the keypad is one of a keyboard and a touch-screen.

* * * * *